US009247095B2

(12) United States Patent
Kawamura

(10) Patent No.: US 9,247,095 B2
(45) Date of Patent: Jan. 26, 2016

(54) IMAGE SENSOR UNIT, IMAGE READING APPARATUS, AND IMAGE FORMING APPARATUS

(71) Applicant: CANON COMPONENTS, INC., Kodama-gun, Saitama (JP)

(72) Inventor: Takehiro Kawamura, Saitama (JP)

(73) Assignee: CANON COMPONENTS, INC., Kodama-gun (JP)

( * ) Notice: Subject to any disclaimer, the term of this patent is extended or adjusted under 35 U.S.C. 154(b) by 0 days.

(21) Appl. No.: 14/090,480

(22) Filed: Nov. 26, 2013

(65) Prior Publication Data

US 2014/0168727 A1 Jun. 19, 2014

(30) Foreign Application Priority Data

Dec. 19, 2012 (JP) ................................ 2012-277270

(51) Int. Cl.
  *H04N 1/04* (2006.01)
  *H04N 1/19* (2006.01)
  *H04N 1/03* (2006.01)
  *H04N 1/031* (2006.01)
(52) U.S. Cl.
  CPC . *H04N 1/19* (2013.01); *H04N 1/03* (2013.01); *H04N 1/031* (2013.01)
(58) Field of Classification Search
  USPC ............... 358/482, 483, 472, 496; 362/97.3; 315/192; 349/65
  See application file for complete search history.

(56) References Cited

U.S. PATENT DOCUMENTS

| 4,742,240 | A | * | 5/1988 | Yamanishi et al. ........... 358/300 |
| 5,750,985 | A | * | 5/1998 | Suzuki ........................ 250/234 |
| 6,864,999 | B1 | * | 3/2005 | Fujimoto et al. ............. 358/472 |
| 7,084,472 | B2 | * | 8/2006 | Fukuyoshi et al. ........... 257/432 |
| 8,089,582 | B2 | * | 1/2012 | Sekiguchi et al. ............. 349/65 |
| 2005/0134712 | A1 | * | 6/2005 | Gruhlke ................. G02B 5/201 348/272 |
| 2005/0161583 | A1 | | 7/2005 | Matsumoto |
| 2013/0009558 | A1 | * | 1/2013 | An et al. ....................... 315/192 |
| 2014/0104816 | A1 | * | 4/2014 | Takasi et al. ................. 362/97.3 |

FOREIGN PATENT DOCUMENTS

| JP | 04-373250 A | 12/1992 |
| JP | 2000-175001 A | 6/2000 |
| JP | 2005217630 A | 8/2005 |

OTHER PUBLICATIONS

Office Action issued in corresponding Japanese Patent Application No. 2013-254047, dated Jan. 27, 2015.

* cited by examiner

*Primary Examiner* — Houshang Safaipour
(74) *Attorney, Agent, or Firm* — Rossi, Kimms & McDowell LLP

(57) ABSTRACT

An image sensor unit includes: a plurality of sensor substrates that are connected in a main-scan direction and that are provided with sensor chips in the main-scan direction, the sensor chips converting light from an original to electric signals; and a plurality of rod-lens arrays that are connected in the main-scan direction and that are provided with a plurality of rod lenses in the main-scan direction, the rod lenses focusing the light from the original on the sensor chips, wherein connection positions between the plurality of sensor substrates are arranged at positions not overlapping with connection positions between the plurality of rod-lens arrays. A decrease in reading accuracy of an image can be reduced even if short constituent members are connected in the main-scan direction to form an elongated image sensor unit.

23 Claims, 12 Drawing Sheets

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2012-277270, filed on Dec. 19, 2012, the entire contents of which are incorporated herein by reference.

BACKGROUND OF THE INVENTION

1. Field of the Invention

The present invention relates to an image sensor unit, an image reading apparatus, and an image forming apparatus. Particularly, the present invention relates to an image sensor unit, an image reading apparatus, and an image forming apparatus used to read a large original (large-sized original) and the like.

2. Description of the Related Art

Readable lengths (hereinafter, "read lengths") of originals are generally about A4, B4, and A3 sizes in an image sensor unit used in an image reading apparatus or an image forming apparatus. In recent years, an elongated image sensor unit that can read large originals in A2, A1, and A0 sizes exceeding the read length of A3 size is used in an image reading apparatus, such as an electronic white board.

In the elongated image sensor unit, a plurality of short sensor substrates can be connected in a main-scan direction, or a plurality of short rod-lens arrays can be connected in the main-scan direction to reduce cost. Patent Document 1 discloses an image sensor including a plurality of short rod-lens arrays that are continuously arranged throughout a predetermined read length.

Patent Document 1: Japanese Laid-open Patent Publication No. 2005-217630

In the image sensor unit used in an electronic white board and the like, an image to be read includes large characters, and reading accuracy is not a problem. However, in an image sensor unit or the like used to read a large map and the like, fine reading accuracy is demanded as in reading of an original in general size.

When a plurality of short sensor substrates and a plurality of short rod-lens arrays are connected to the image sensor unit that requires fine reading accuracy, the sensor substrates to be connected and the rod-lens arrays to be connected need to be accurately connected. On the other hand, even if the sensor substrates to be connected and the rod-lens arrays to be connected are connected within an acceptable connection error, there is a problem that the reading accuracy is reduced in some cases if connection positions between the sensor substrates and connection positions between the rod-lens arrays are closely arranged.

SUMMARY OF THE INVENTION

The present invention has been made in view of the foregoing problems, and an object of the present invention is to reduce a decrease in reading accuracy of an image even if a plurality of imaging element arrays are connected and a plurality of sensor substrates are connected to form an image sensor unit.

The present invention provides an image sensor unit including: a plurality of sensor substrates that are connected in a main-scan direction and that are provided with sensor chips in the main-scan direction, the sensor chips converting light from an object to be read to electric signals; and a plurality of imaging element arrays that are connected in the main-scan direction and that focus the light from the object to be read on the sensor chips, wherein connection positions between the plurality of sensor substrates are arranged at positions not overlapping with connection positions between the plurality of imaging element arrays in the main-scan direction.

The present invention provides an image reading apparatus including: an image sensor unit; and an image reading portion that reads light from an object to be read while relatively moving the image sensor unit and the object to be read, the image sensor unit including: a plurality of sensor substrates that are connected in a main-scan direction and that are provided with a plurality of sensor chips in the main-scan direction, the sensor chips converting the light from the object to be read to electric signals; and a plurality of imaging element arrays that are connected in the main-scan direction and that are provided with a plurality of imaging elements in the main-scan direction, the imaging elements focusing the light from the object to be read on the sensor chips, wherein connection positions between the plurality of sensor substrates are arranged at positions not overlapping with connection positions between the plurality of imaging element arrays in the main-scan direction.

The present invention provides an image forming apparatus including: an image sensor unit; an image reading portion that reads light from an object to be read while relatively moving the image sensor unit and the object to be read; and an image forming portion that forms an image in a recording medium, the image sensor unit including: a plurality of sensor substrates that are connected in a main-scan direction and that are provided with a plurality of sensor chips in the main-scan direction, the sensor chips converting the light from the object to be read to electric signals; and a plurality of imaging element arrays that are connected in the main-scan direction and that are provided with a plurality of imaging elements in the main-scan direction, the imaging elements focusing the light from the object to be read on the sensor chips, wherein connection positions between the plurality of sensor substrates are arranged at positions not overlapping with connection positions between the plurality of imaging element arrays in the main-scan direction.

DETAILED DESCRIPTION OF THE PREFERRED EMBODIMENTS

Hereinafter, embodiments of the present invention will be described in detail with reference to the drawings.

In the present embodiments, an image sensor unit described later as well as an image reading apparatus and an image forming apparatus to which the image sensor unit is applied will be described. In the image reading apparatus and the image forming apparatus, the image sensor unit emits light to an original D as an object to be read, and the image sensor unit converts light from the original D to an electric signal to read an image.

Figure 2:
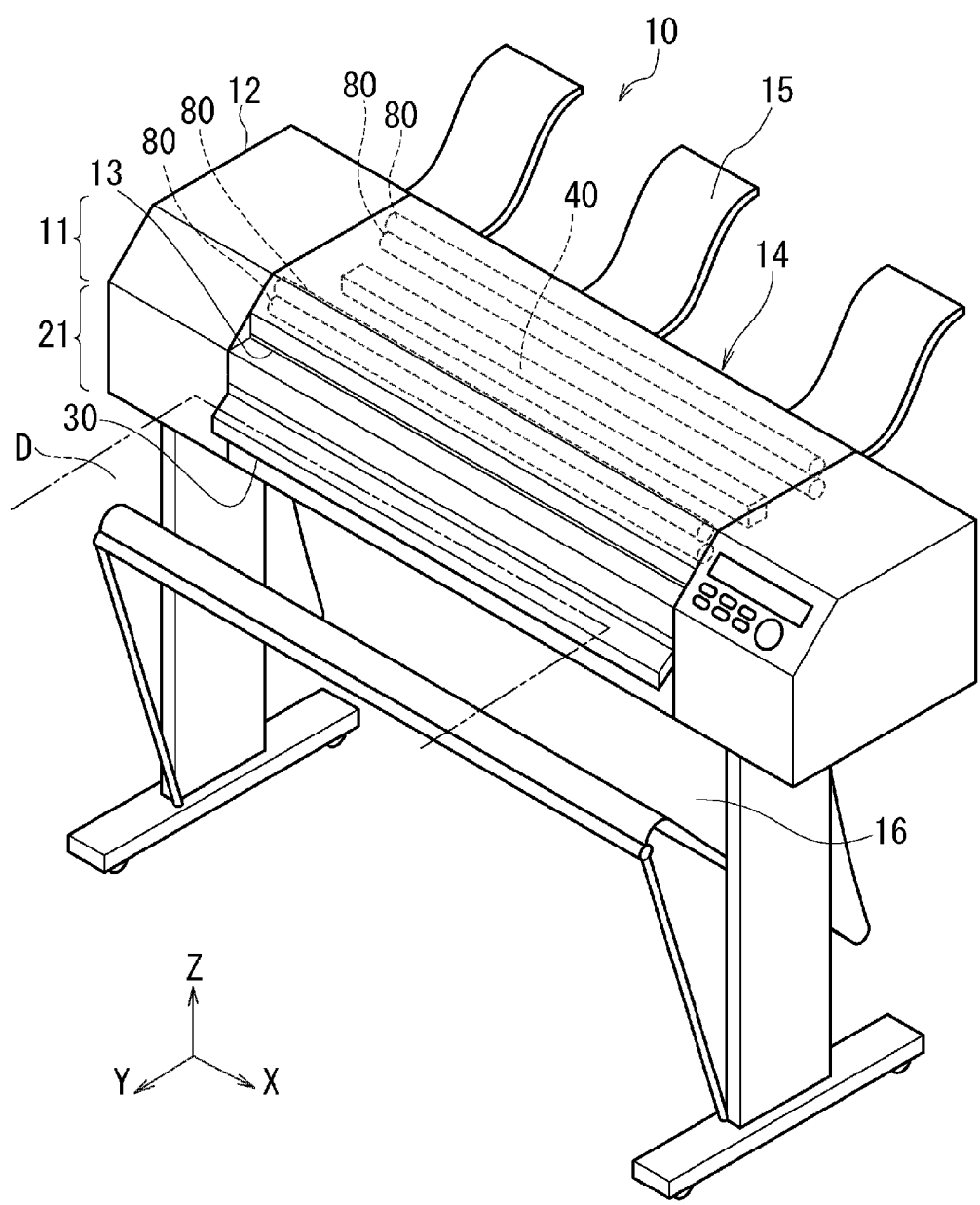
FIG. 2 is a perspective view showing an appearance of an MFP 10.

A multi-function printer (MFP) as an image reading apparatus or an image forming apparatus will be described with reference to FIG. 2. FIG. 2 is a perspective view showing an appearance of an MFP 10 that can handle a large original. As shown in FIG. 2, the MFP 10 includes: an image reading portion 11 as image reading means for reading reflected light from the original D; and an image forming portion 21 as image forming means for forming (printing) an image of the original D on a roll sheet R (recording paper) as a recording medium.

The image reading portion 11 has a function of a so-called image scanner and is configured, for example, as follows. The image reading portion 11 includes a housing 12, a paper feeding opening 13, an original discharge opening 14, an original recovery unit 15, a sheet recovery unit 16, an image sensor unit 40, and original conveyor rollers 80.

The image sensor unit 40 is, for example, a contact image sensor (CIS) unit. The image sensor unit 40 is fixed inside of the housing 12.

In the image reading portion 11, the original D inserted from the paper feeding opening 13 to the housing 12 is placed between the original conveyor rollers 80 rotated and driven by a driving mechanism and conveyed relative to the image sensor unit 40 at a predetermined conveyance speed. The image sensor unit 40 optically reads the conveyed original D, and a sensor chip 51 described later converts the original D to an electric signal to perform a reading operation of an image. The original D subjected to image reading is conveyed by the original conveyor rollers 80 and discharged from the original discharge opening 14. The original recovery unit 15 arranged on a back surface of the housing 12 recovers the original D discharged from the original discharge opening 14.

Figure 3:
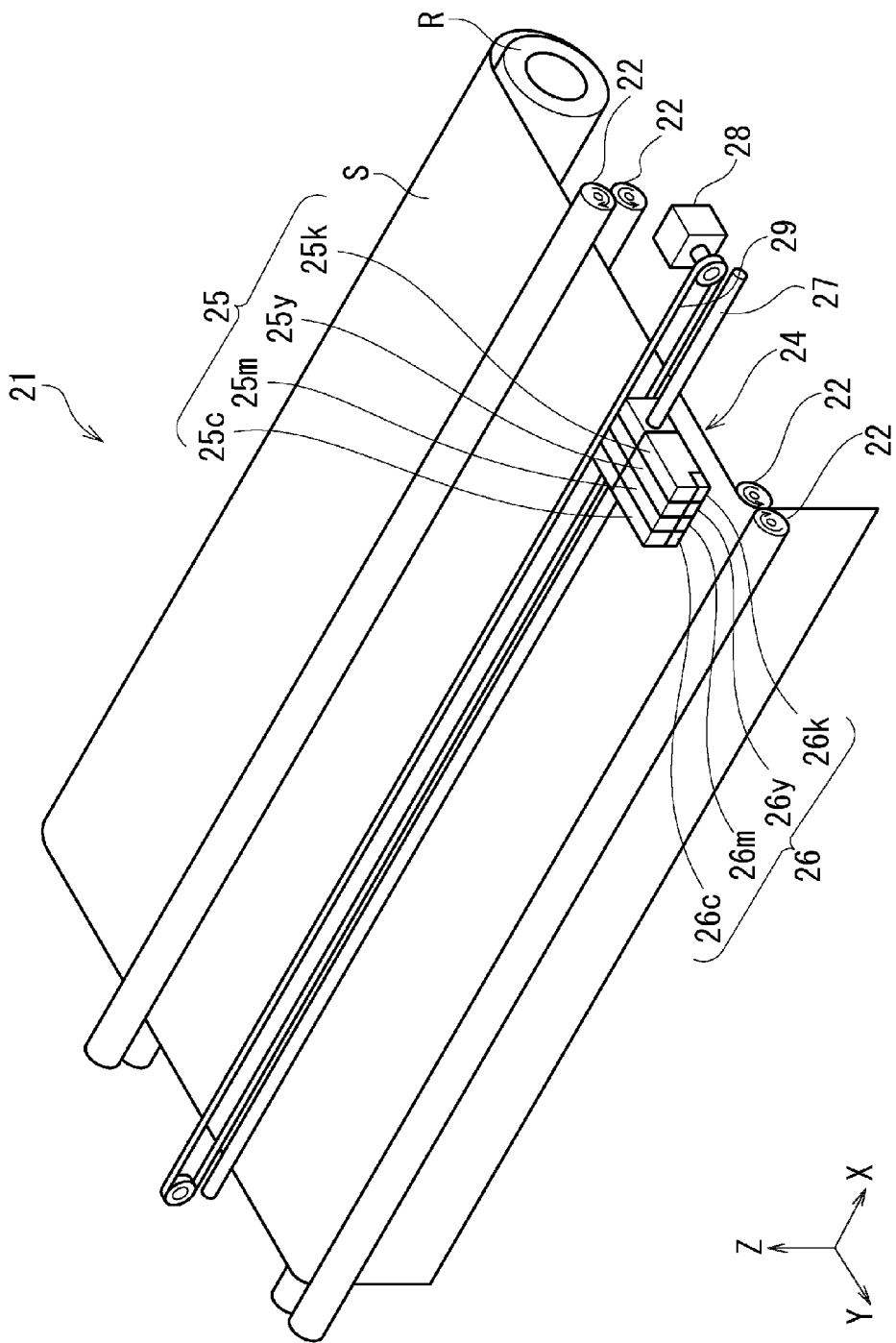
FIG. 3 is a schematic diagram showing a structure of an image forming portion 21.

FIG. 3 is a schematic diagram showing a structure of the image forming portion 21.

The image forming portion 21 with a function of a so-called printer is housed in the housing 12 and is configured, for example, as follows. The image forming portion 21 includes the roll sheet R, sheet conveyor rollers 22, and a printer head 24. The printer head 24 includes, for example, ink tanks 25 (25c, 25m, 25y, and 25k) with cyan C, magenta M, yellow Y, and black K inks and discharge heads 26 (26c, 26m, 26y, and 26k) arranged on the ink tanks 25, respectively. The image forming portion 21 also includes a printer head slide shaft 27, a printer head drive motor 28, and a belt 29 attached to the printer head 24. As shown in FIG. 2, the image forming portion 21 further includes a sheet discharge opening 30 from which a printed sheet S is discharged.

In the image forming portion 21, the sheet S as one end of the continuous roll sheet R is placed between the sheet conveyor rollers 22 rotated and driven by the driving mechanism and is conveyed to a printing position. The printer head drive motor 28 mechanically moves the belt 29, and the printer head 24 moves in a printing direction (main-scan direction) along the printer head slide shaft 27 to print the image on the sheet S based on the electric signal. The operation is repeated until the printing is finished, and the printed sheet S is cut in the main-scan direction. The cut sheet S is discharged from the sheet discharge opening 30 by the sheet conveyor rollers 22. The sheet recovery unit 16 arranged below the housing 12 recovers the sheet S discharged from the sheet discharge opening 30.

Although an inkjet-type image forming apparatus has been described as the image forming portion 21, the type can be any type, such as an electrophotographic type, a thermal transfer type, and a dot impact type.

A configuration of the image sensor unit 40 of the present invention will be described with reference to the drawings.

First Embodiment

Figure 4:
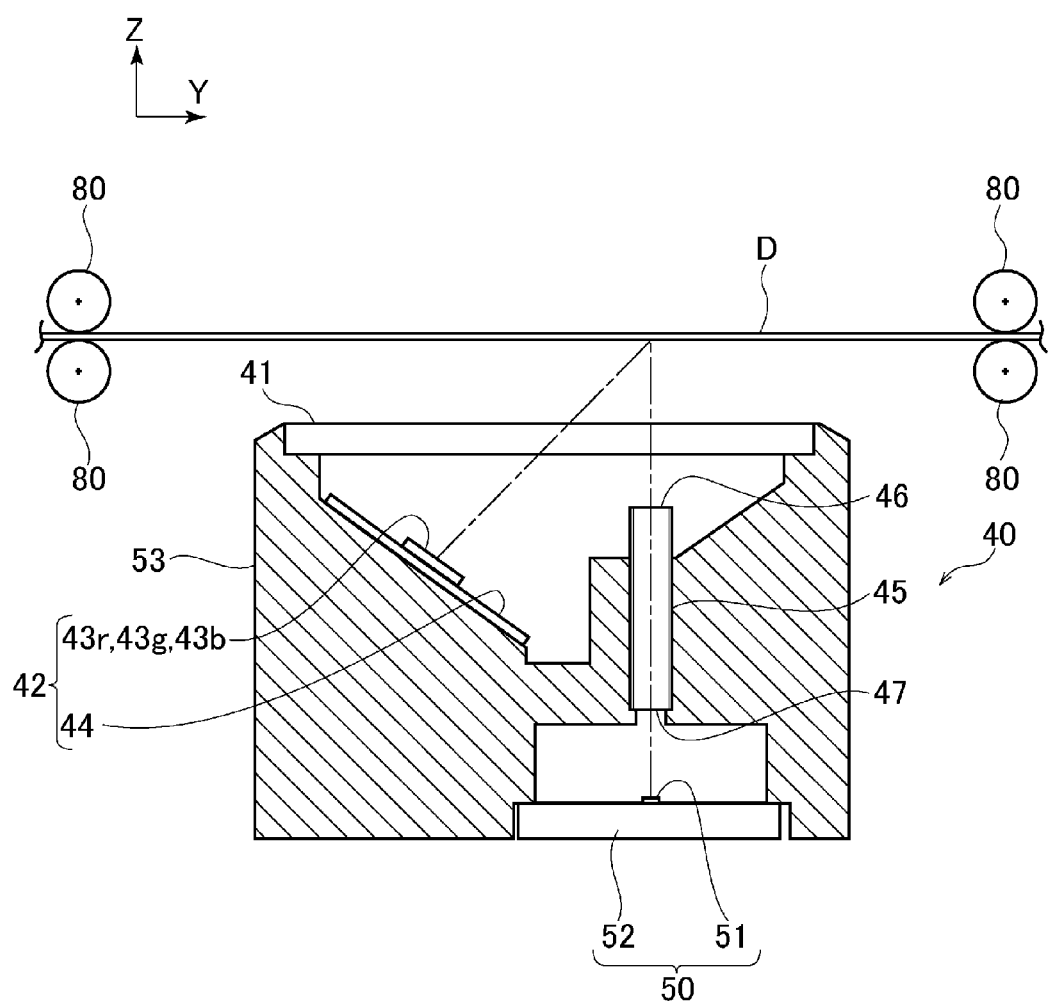
FIG. 4 is a sectional view of an image sensor unit 40 cut in a sub-scan direction.
Figure 5:
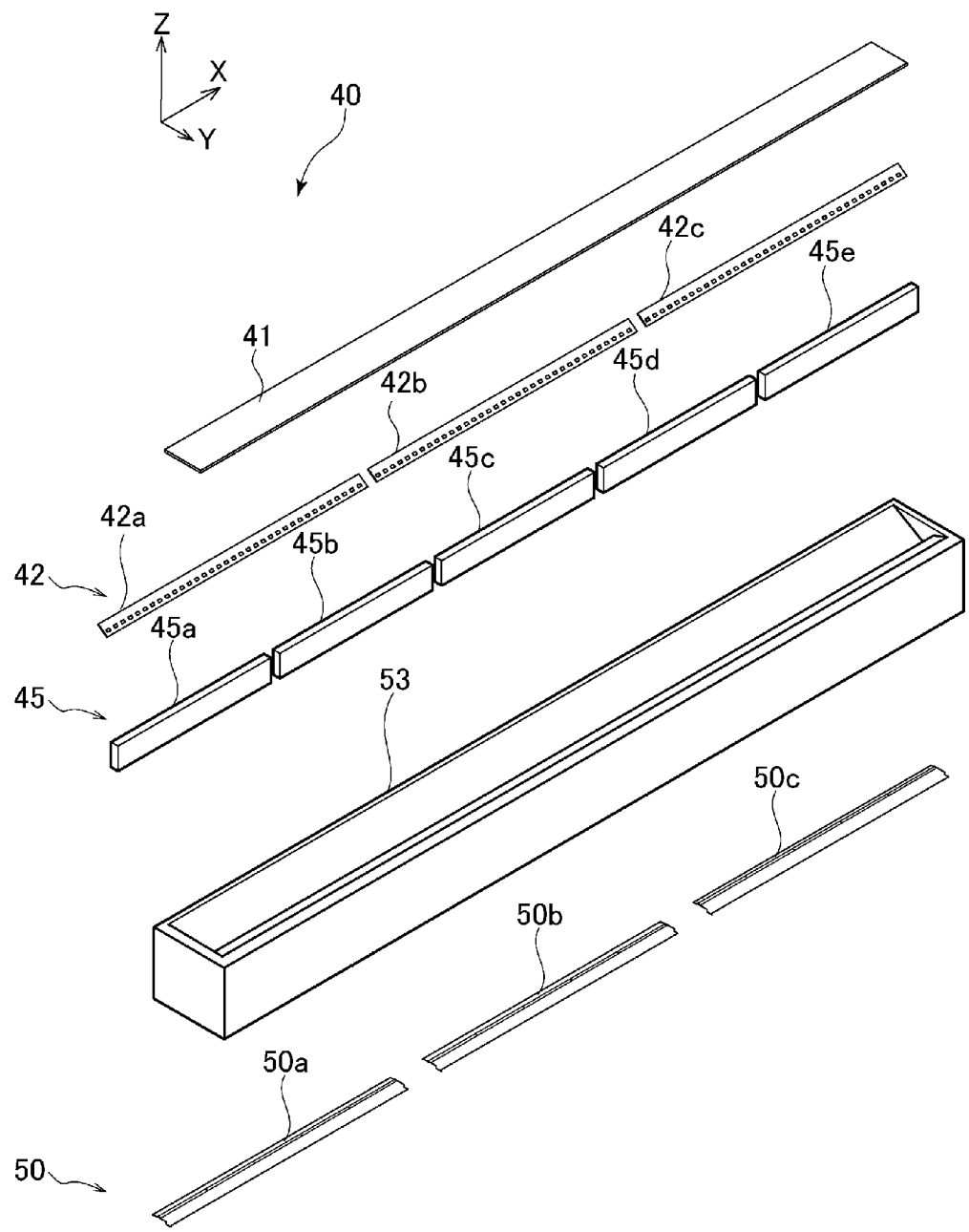
FIG. 5 is a perspective view of constituent members of the image sensor unit 40.
Figure 6:
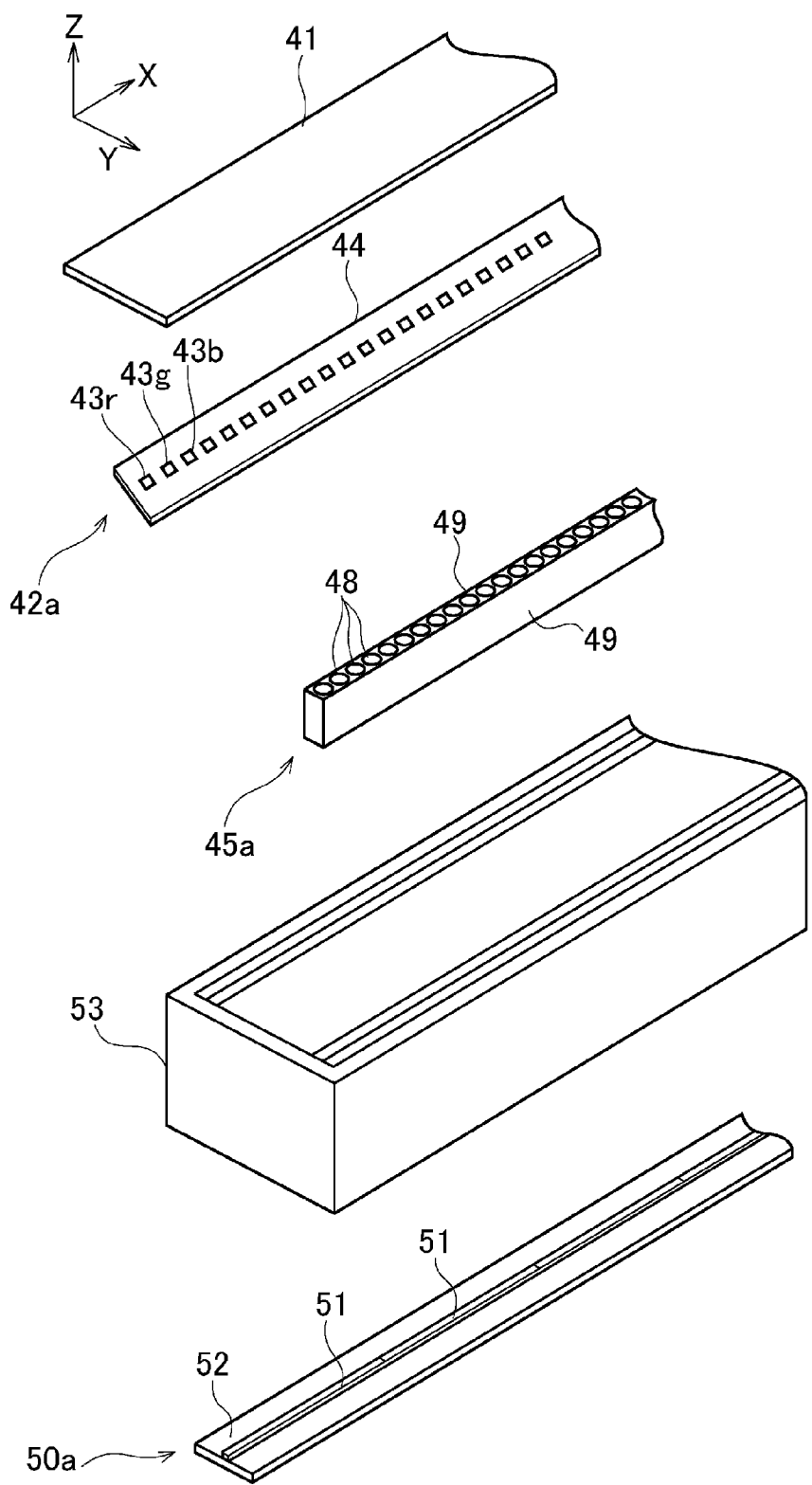
FIG. 6 is a partially enlarged perspective view of the constituent members of the image sensor unit 40.

FIG. 4 is a sectional view of the image sensor unit 40 cut in a sub-scan direction. FIG. 5 is a perspective view of constituent members of the image sensor unit 40. FIG. 6 is an enlarged perspective view of the constituent members of the image sensor unit 40 shown in FIG. 5. An image sensor unit 40 that can read a large (large-sized) original D in A0 size will be described here.

The image sensor unit 40 has an appearance of a rectangular solid. A longitudinal direction of the image sensor unit 40 is the main-scan direction (X direction), and the sub-scan direction (Y direction) orthogonal to the main-scan direction (X direction) is a conveyance direction of the original D.

The image sensor unit 40 includes: a cover glass 41 as a transparent member; a light source portion 42; a rod-lens array portion 45; a sensor substrate portion 50; a frame 53 as a housing that houses the constituent members described above; and the like.

The cover glass 41 prevents dust and the like from entering the frame 53. The cover glass 41 is planar and fixed on an upper part of the frame 53.

The light source portion 42 illuminates the original D. As shown in FIG. 4, the light source portion 42 is fixed to a position below the cover glass 41 and adjacent to the rod-lens array portion 45 in the frame 53. As shown in FIG. 5, the light source portion 42 includes light sources 42a, 42b, and 42c used for a short image sensor unit that are arranged in a line in the main-scan direction. In the present embodiment, three light sources used for an image sensor unit with a read length of A3 size are connected and used.

As shown in FIG. 6, the light sources 42a to 42c include, for example: light emitting elements 43r, 43g, and 43b with wavelengths of three colors of red R, green G, and blue B; and a substrate 44 for mounting the light emitting elements 43r, 43g, and 43b that is formed long in the main-scan direction. The light emitting elements 43r, 43g, and 43b are, for example, LED chips and are mounted in a predetermined order in the main-scan direction.

The rod-lens array portion 45 focuses the light (reflected light in the present embodiment) from the original D on the sensor chip 51 of the sensor substrate portion 50. As shown in FIG. 4, the rod-lens array portion 45 is fixed at a position below the cover glass 41 and adjacent to the light source portion 42 in the frame 53. The sensor chip 51 is positioned on an extension of an optical axis formed between an incident surface 46 and an emission surface 47 of the rod-lens array portion 45. As shown in FIG. 5, the rod-lens array portion 45 includes rod-lens arrays 45a, 45b, 45c, 45d, and 45e as imaging element arrays used for a short image sensor unit that are connected in a line in the main-scan direction. In the present embodiment, five rod-lens arrays used for an image sensor unit with a read length of A4 size are connected.

As shown in FIG. 6, each of the rod-lens arrays 45a to 45e includes rod lenses 48 as a plurality of imaging elements of an erect equal magnification imaging type arranged in the main-scan direction with the optical axes being parallel, and the rod lenses 48 are placed between side walls 49 from both sides in the sub-scan direction. The rod-lens arrays 45a to 45e are connected by a well-known method using an adhesive or the like in the frame 53. In some cases, the rod-lens arrays 45a to 45e are connected by being displaced in the sub-scan direction and the like within a range of an acceptable connection error.

The sensor substrate portion 50 converts the reflected light focused by the rod-lens array portion 45 to an electric signal. As shown in FIG. 4, the sensor substrate portion 50 is fixed to a lower end of the frame 53 by thermal caulking or the like. As shown in FIG. 5, the sensor substrate portion 50 includes sensor substrates 50a, 50b, and 50c used for a short image sensor unit that are connected in a line in the main-scan direction. In the present embodiment, three sensor substrates used for an image sensor unit with a read length of A3 size are connected.

As shown in FIG. 6, each of the sensor substrates 50a to 50c includes a plurality of sensor chips 51 and a substrate 52 on which the plurality of sensor chips 51 are mounted in the main-scan direction. The sensor substrates 50a to 50c are connected by a well-known method using screws or the like. In some cases, the sensor substrates 50a to 50c are connected by being displaced in the sub-scan direction and the like within a range of an acceptable connection error.

The frame 53 houses the constituent members of the image sensor unit 40. As shown in FIG. 4, a plurality of projections and recesses are formed inside of the frame 53 to position and hold the constituent members of the image sensor unit 40. As shown in FIG. 5, the frame 53 is formed in a rectangular solid shape that is a little longer than the read length in the main-scan direction.

Reading of the original D by the image sensor unit 40 with the configuration will be described. As shown in FIG. 4, the image sensor unit 40 successively activates the light emitting elements 43r, 43g, and 43b of the light source portion 42 to emit light to the original D conveyed by the original conveyor rollers 80 in the sub-scan direction at a predetermined conveyance speed. The light emitted from the light source portion 42 uniformly illuminates the reading surface of the original D throughout the main-scan direction. The original D reflects the emitted light, and the light is focused on the sensor chip 51 through the rod-lens array portion 45. The sensor chip 51 converts the focused reflected light to an electric signal, and the image sensor unit 40 can read the image of the original D.

The image sensor unit 40 reads the reflected light of one scan line, and the reading operation of one scan line in the main-scan direction of the original D is completed. After the completion of the reading operation of one scan line, reading operation of the next scan line is performed in the same way as the operation described above, along with relative movement of the original D in the sub-scan direction. In this way, the image sensor unit 40 repeats the reading operation of one scan line while moving in the sub-scan direction to thereby successively scan the entire surface of the original D to read the image.

A reduction in the reading accuracy in an image sensor unit formed by connecting a plurality of sensor substrates and connecting a plurality of rod-lens arrays will be described here.

Figure 10:
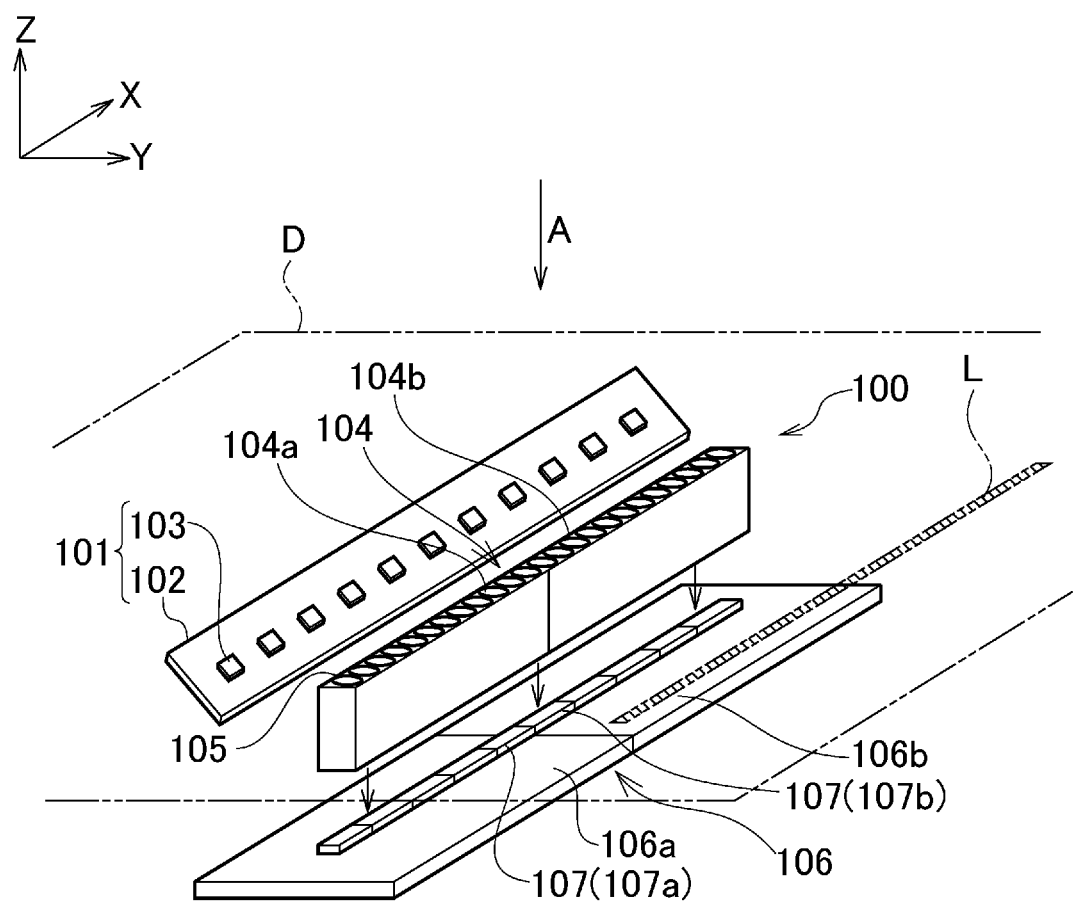
FIG. 10 is a schematic view showing an internal structure of an image sensor unit 100 of a comparative example.

FIG. 10 is a schematic view showing an internal configuration of an image sensor unit 100 according to a comparative example. A light source portion 101, a rod-lens array portion 104, and a sensor substrate portion 106 are arranged inside of the image sensor unit 100. The image sensor unit 100 relatively moves in the sub-scan direction (Y direction) of the original D.

The light source portion 101 includes a plurality of light emitting elements 103 mounted on a mounting surface of a substrate 102 formed long in the main-scan direction (X direction). The light source portion 101 illuminates the original D from below.

The rod-lens array portion 104 includes a short first rod-lens array 104a and a short second rod-lens array 104b connected in the main-scan direction to be compatible with the elongated image sensor unit 100. Each of the rod-lens arrays 104a and 104b includes a plurality of rod lenses 105 of an erect equal magnification imaging type arranged in the main-scan direction. The rod-lens array portion 104 focuses the reflected light from the original D on a sensor chip 107 mounted on the sensor substrate portion 106.

The sensor substrate portion 106 includes a short first sensor substrate 106a and a short second sensor substrate 106b connected in the main-scan direction to be compatible with the elongated image sensor unit 100. The sensor substrates 106a and 106b include a plurality of sensor chips 107 (107a and 107b) mounted in the main-scan direction. Each sensor chip 107 includes a plurality of light receiving elements 108 described later arranged in the main-scan direction. The sensor chip 107 converts the reflected light focused by the rod-lens array portion 104 to an electric signal. The sensor substrates 106a and 106b are arranged at positions that cause the sensor chips 107 to coincide with the optical axes of the rod lenses 105 in the sub-scan direction.

FIGS. 11A to 11D are views showing examples of an arrangement relationship between the rod-lens arrays 104a and 104b and the sensor chips 107a and 107b seen from an arrow A direction shown in FIG. 10. The light receiving elements 108 are arranged on the sensor chips 107a and 107b. A connection position of the first rod-lens array 104a and the second rod-lens array 104b overlaps with a connection position of the first sensor substrate 106a and the second sensor substrate 106b in the main-scan direction.

Figure 11A:
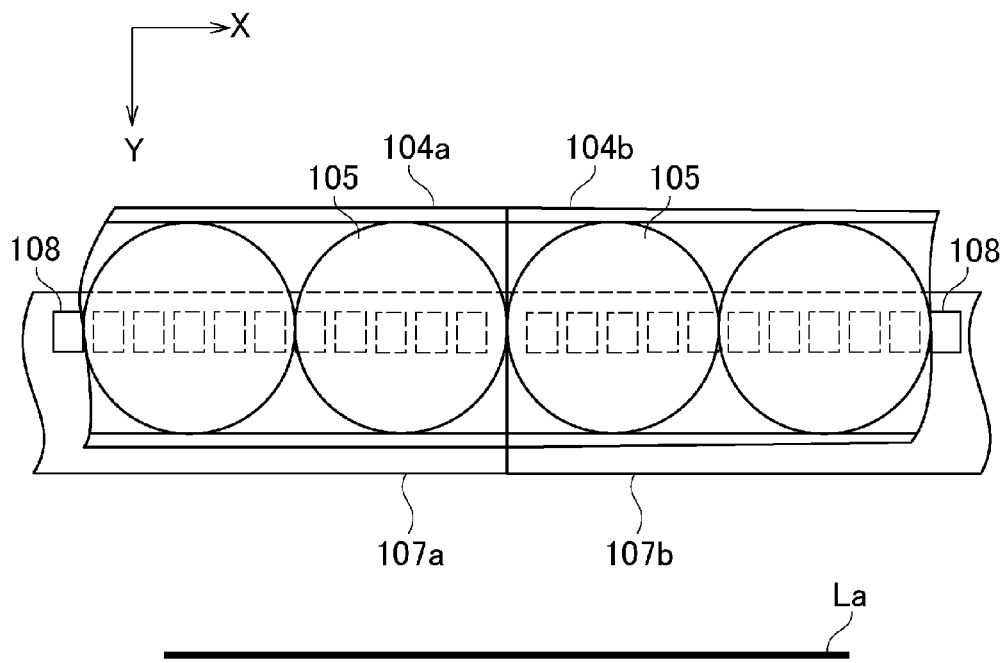
FIG. 11A is a view showing an example of an arrangement relationship between rod-lens arrays 104a and 104b and sensor chips 107a and 107b of the image sensor unit 100 of the comparative example.

In FIG. 11A, the first rod-lens array 104a and the second rod-lens array 104b are accurately connected without being displaced. Since the first sensor substrate 106a and the second sensor substrate 106b are accurately connected, the first sensor chip 107a and the second sensor chip 107b are accurately arranged without being displaced. In this case, when the image sensor unit 100 relatively moves in the sub-scan direction to read an image of a line L in the main-scan direction drawn in the original D shown in FIG. 10, an image of a line La extending in the main-scan direction can be read as shown in FIG. 11A.

Figure 11B:
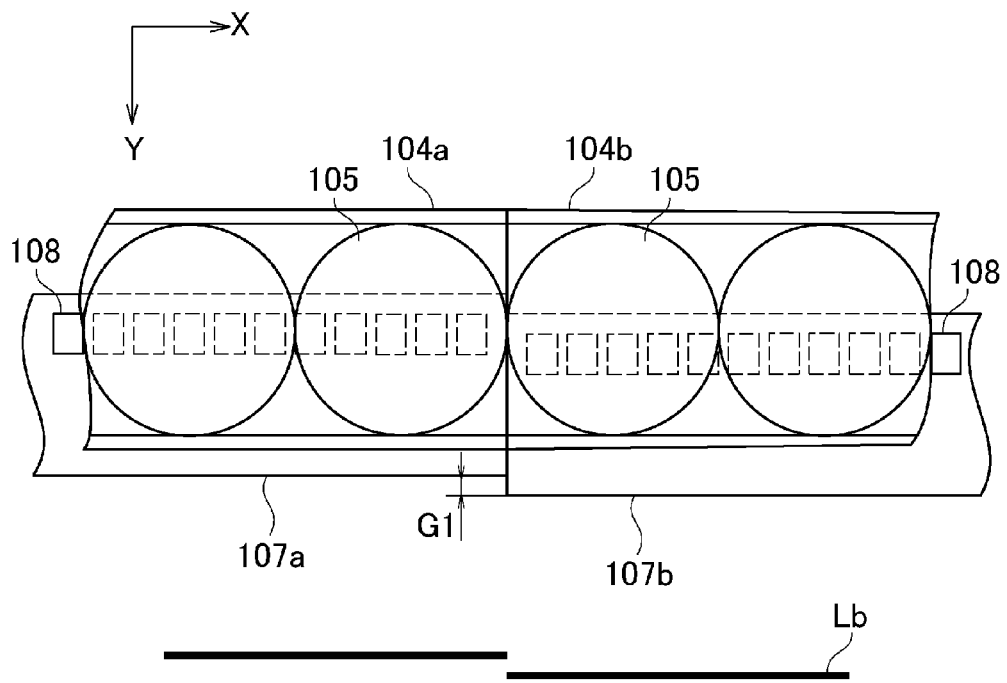
FIG. 11B is a view showing an example of the arrangement relationship between the rod-lens array 104a and 104b and the sensor chips 107a and 107b of the image sensor unit 100 of the comparative example.

In FIG. 11B, the first rod-lens array 104a and the second rod-lens array 104b are accurately connected. On the other hand, since the first sensor substrate 106a and the second sensor substrate 106b are connected by being displaced in the sub-scan direction, the first sensor chip 107a and the second sensor chip 107b are displaced by G1 in the sub-scan direction. In this case, when the image sensor unit 100 reads the image of the line L shown in FIG. 10, an image of a line Lb displaced in the sub-scan direction as shown in FIG. 11B is read.

Figure 11C:
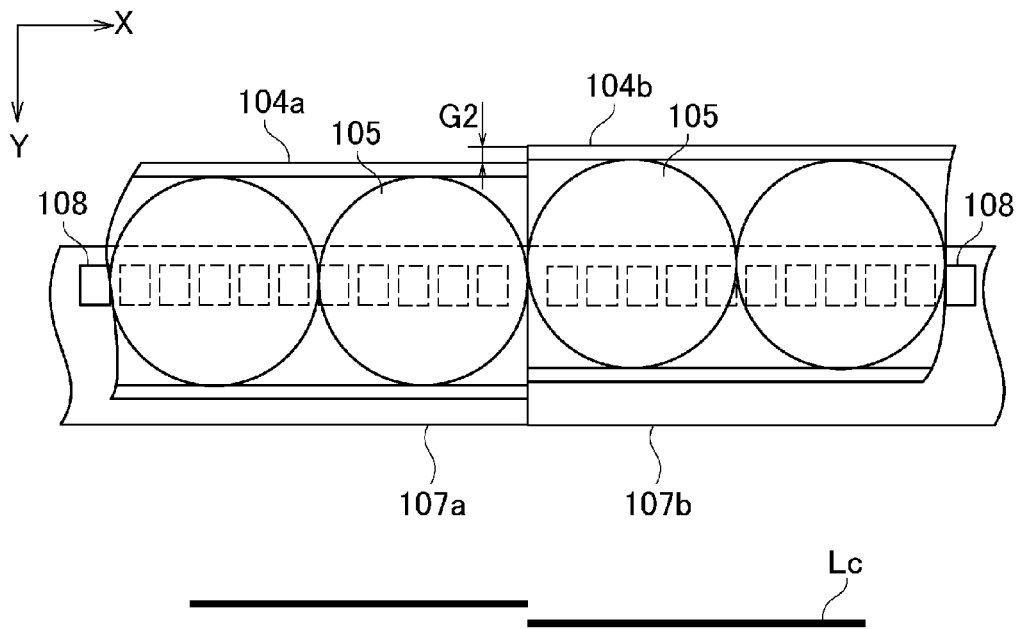
FIG. 11C is a view showing an example of the arrangement relationship between the rod-lens arrays 104a and 104b and the sensor chips 107a and 107b of the image sensor unit 100 of the comparative example.

In FIG. 11C, since the first sensor substrate 106a and the second sensor substrate 106b are accurately connected, the first sensor chip 107a and the second sensor chip 107b are accurately arranged without being displaced. On the other hand, the first rod-lens array 104a and the second rod-lens array 104b are connected by being displaced by G2 in the sub-scan direction. In this case, when the image sensor unit 100 reads the image of the line L shown in FIG. 10, an image of a line Lc displaced in the sub-scan direction as shown in FIG. 11C is read.

Figure 11D:
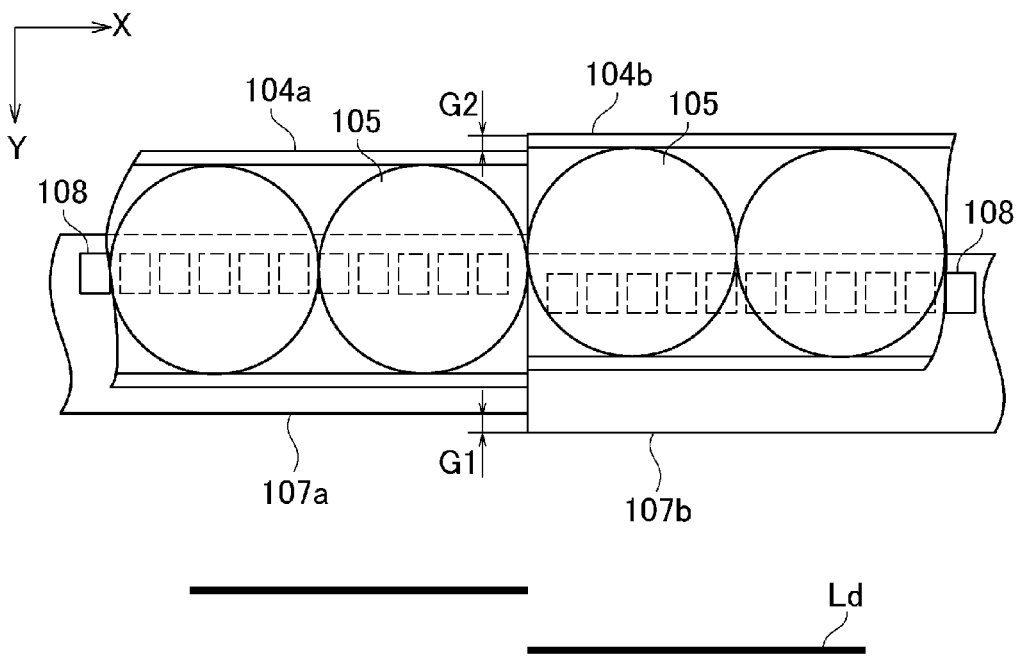
FIG. 11D is a view showing an example of the arrangement relationship between the rod-lens arrays 104a and 104b and the sensor chips 107a and 107b of the image sensor unit 100 of the comparative example.

In FIG. 11D, since the first sensor substrate 106a and the second sensor substrate 106b are connected by being displaced in the sub-scan direction, the first sensor chip 107a and the second sensor chip 107b are displaced by G1 in the sub-scan direction. Furthermore, the first rod-lens array 104a and the second rod-lens array 104b are connected by being displaced by G2 in the sub-scan direction. In this case, when the image sensor unit 100 reads the image of the line L shown in FIG. 10, an image of a line Ld significantly displaced in the sub-scan direction as shown in FIG. 11D is read.

An amount of displacement of the displaced line Ld shown in FIG. 11D is greater than that of the displaced line Lb shown in FIG. 11B and that of the displaced line Lc shown in FIG. 11C.

There is a problem that even if the connection error of only G1 or G2 as shown in FIG. 11B or 11C is an acceptable connection error, the reading accuracy of the image is significantly reduced if the connection error of G1 and the connector error G2 are integrated as shown in FIG. 11D.

In the present embodiment, the rod-lens array portion 45 includes the rod-lens arrays 45a to 45e used for A4 size that are connected in the main-scan direction, and the sensor substrate portion 50 includes the sensor substrates 50a to 50c used for A3 size that are connected in the main-scan direction, as described above. Therefore, the connection positions between the rod-lens arrays 45a to 45e and the connection positions between the sensor substrates 50a to 50c do not overlap in the main-scan direction, and the connection positions can be displaced in the main-scan direction.

Figure 1:
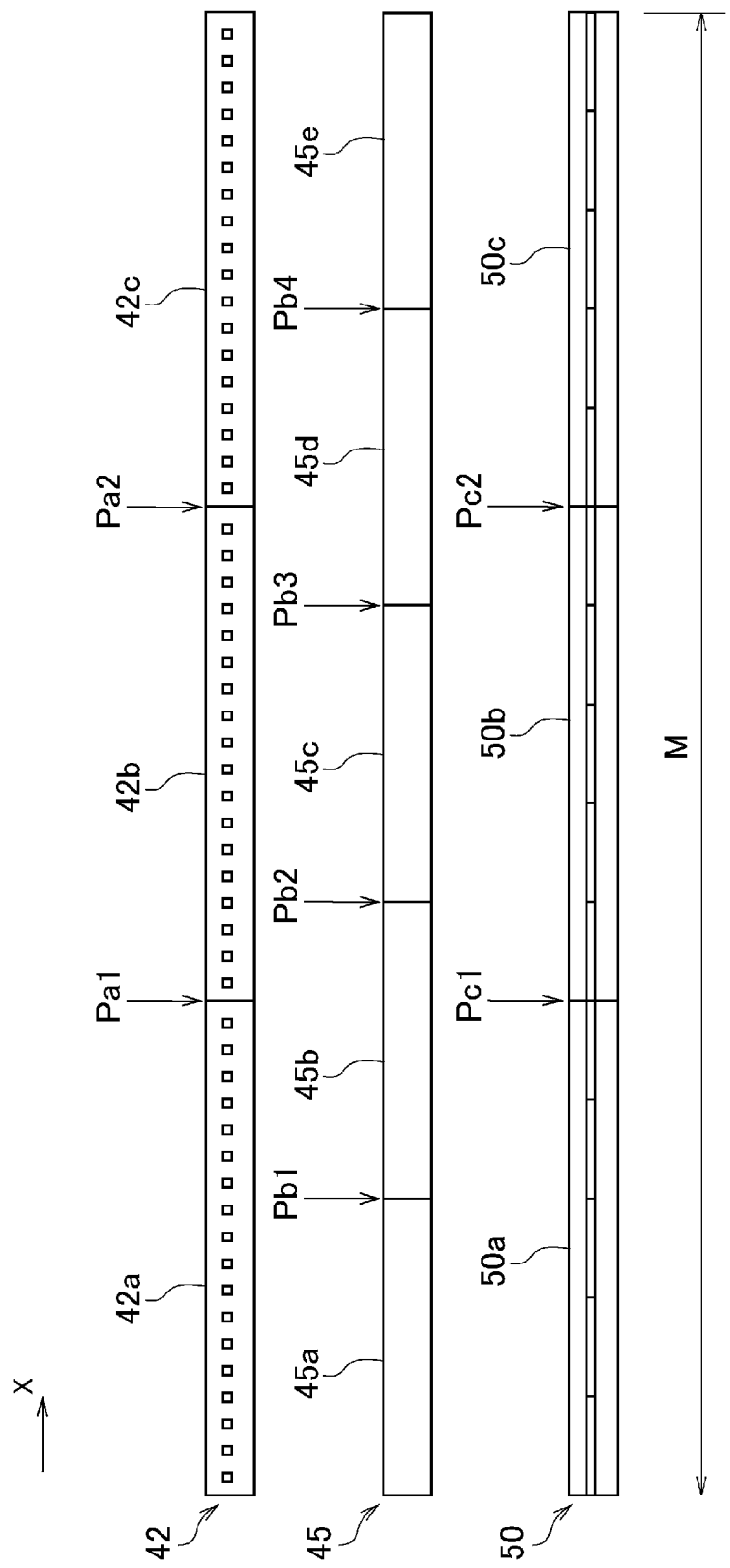
FIG. 1 is a schematic view showing connection positions between rod-lens arrays 45a to 45e and connection positions between sensor substrates 50a to 50c.

Specifically, the connection positions in the main-scan direction will be described with reference to FIG. 1. FIG. 1 is a schematic view showing connection positions in the main-scan direction when the light source portion 42, the rod-lens array portion 45, and the sensor substrate portion 50 are attached inside of the frame 53.

The light source portion 42 includes the light sources 42a to 42c used for A3 size that are connected in a line in the main-scan direction. Therefore, a connection position Pa1 of the light source 42a and the light source 42b and a connection position Pa2 of the light source 42b and the light source 42c are positions that equally divide a read length M into three parts.

The rod-lens array portion 45 includes the rod-lens arrays 45a to 45e used for A4 size that are connected in a line in the main-scan direction. Therefore, a connection position Pb1 of the rod-lens array 45a and the rod-lens array 45b, a connection position Pb2 of the rod-lens array 45b and the rod-lens array 45c, a connection position Pb3 of the rod-lens array 45c and the rod-lens array 45d, and a connection position Pb4 of the rod-lens array 45d and the rod-lens array 45e are positions that equally divide the read length M into five parts.

The sensor substrate portion 50 includes the sensor substrates 50a to 50c used for A3 size connected in a line in the main-scan direction. Therefore, a connection position Pc1 of the sensor substrate 50a and the sensor substrate 50b and a connection position Pc2 of the sensor substrate 50b and the sensor substrate 50c are positions that equally divide the read length M into three parts.

As shown in FIG. 1, the connection positions Pb1 to Pb4 between the rod-lens arrays 45a to 45e and the connection positions Pc1 and Pc2 between the sensor substrates 50a and 50c are arranged at positions not overlapped in the main-scan direction. Therefore, when the image sensor unit 40 reads the original D, a decrease in the reading accuracy of the image caused by the integration of the connection error between the rod-lens arrays 45a to 45e and the connection error between the sensor substrate 50a to 50c can be reduced.

More specifically, even if the connection error between the rod-lens arrays 45a to 45e and the connection error between the sensor substrates 50a to 50c are within an acceptable range, the connection errors may be integrated if the connection positions between the rod-lens arrays 45a to 45e and the connection positions between the sensor substrates 50a to 50c overlap in the main-scan direction, and the reading accuracy of the image may be reduced. In the present embodiment, since the connection positions Pb1 to Pb4 between the rod-lens arrays 45a to 45e and the connection positions Pc1 and Pc2 between the sensor substrates 50a to 50c do not overlap in the main-scan direction, the connection error between the rod-lens arrays 45a to 45e and the connection error between the sensor substrates 50a to 50c are not integrated, and the decrease in the reading accuracy of the image can be reduced.

Figure 7:
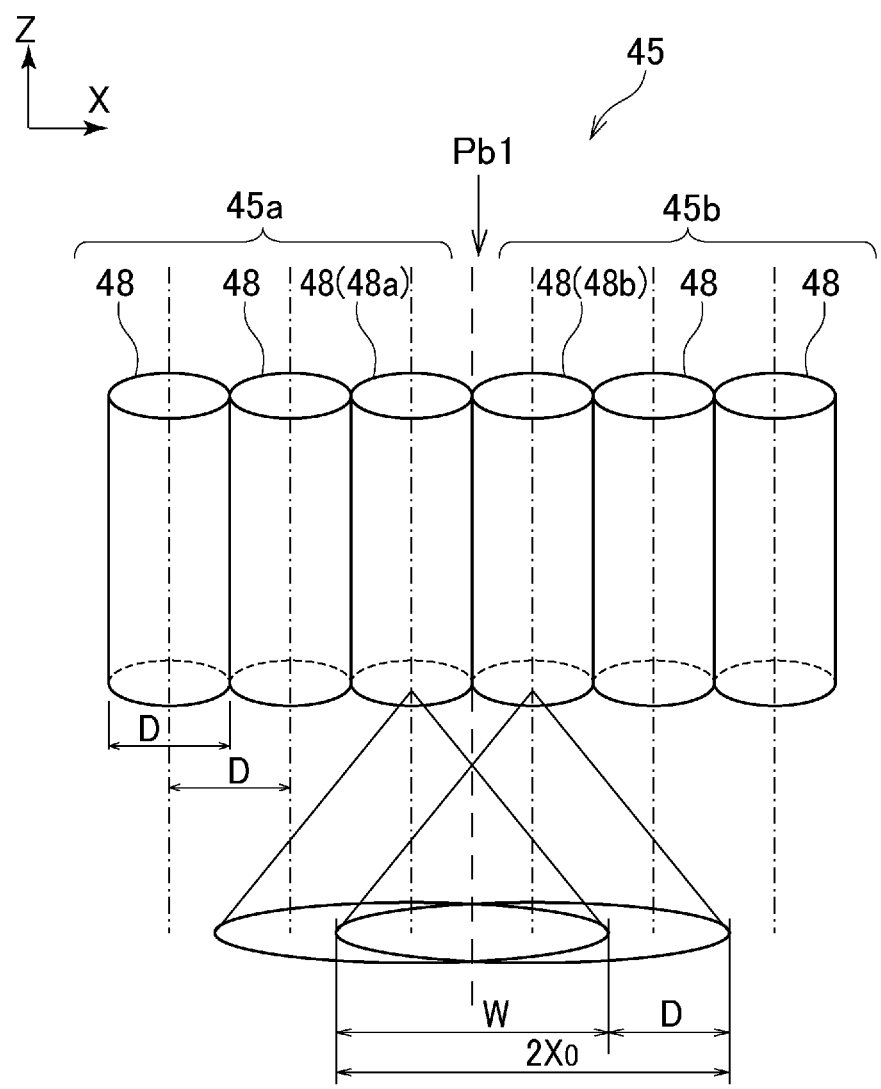
FIG. 7 is an enlarged view of a connection position Pb1 between a rod-lens array 45a and a rod-lens array 45b.

A range W that the connection positions between the rod-lens arrays 45a to 45e and the connection positions between the sensor substrates 50a to 50c are not overlapped in the main-scan direction will be described with reference to FIG. 7. FIG. 7 is an enlarged view of the connection position Pb1 between the rod-lens array 45a and the rod-lens array 45b. Here, a diameter of the rod lenses 48 is D. A field radius of the rod lenses 48 is $X_0$, and a field diameter is $2X_0$. The field radius denotes a radius of an image when the rod lens 48 focuses the reflected light on the sensor chip 51. A rod lens adjacent to the connection position Pb1 in the rod-lens array 45a is a rod lens 48a, and a rod lens adjacent to the connection position Pb1 in the rod-lens array 45b is a rod lens 48b.

It is assumed here that the rod-lens array 45a and the rod-lens array 45b have a connection error within an acceptable range in the sub-scan direction. In this case, the reflected lights focused on the sensor chip 51 from the rod lens 48a and the rod lens 48b are displaced in the sub-scan direction in the range W where the field diameter $2X_0$ of the rod lens 48a and the field diameter $2X_0$ of the rod lens 48b overlap. If the connection position of the sensor substrate 50a and the sensor substrate 50b with connection errors within the acceptable range in the sub-scan direction is arranged in the range W, the connection errors may be integrated. More specifically, the image sensor unit 40 reads the image of the original D as an image displaced out of the acceptable range in the sub-scan direction.

Therefore, when the sensor substrates 50a to 50c are connected in the present embodiment, positions separated from the range W in the main-scan direction are set as the connection positions. Therefore, the integration of the connection error between the sensor substrates 50a to 50c and the connection error between the rod-lens arrays 45a to 45e are prevented, and the decrease in the reading accuracy of the image can be reduced.

If pitches between the rod lenses 48 shown in FIG. 7 have the same dimension as the diameter D of the rod-lens arrays 45a to 45e, the range W that the connection positions of the sensor substrates 50a to 50c are not overlapped in the main-scan direction can be calculated by $$W = 2X_0 - D,$$

as shown in FIG. 7.

In this way, according to the present embodiment, even if the elongated image sensor unit 40 is formed by connecting the plurality of short rod-lens arrays 45a to 45e and connecting the plurality of short sensor substrates 50a to 50c, the decrease in the reading accuracy of the image can be reduced by arranging the connection positions between the rod-lens arrays 45a to 45e and the connection positions between the sensor substrates 50a to 50c at positions that do not overlap in the main-scan direction.

Although the image sensor unit 40 of A0 size has been described in the present embodiment, the arrangement is not limited to this. The size of the image sensor unit is not limited as long as an elongated image sensor unit is formed by connecting a plurality of short rod-lens arrays and connecting a plurality of short sensor substrates. Although the image sensor unit 40 formed by connecting five rod-lens arrays 45a to 45e of A4 size and connecting three sensor substrates 50a to 50c of A3 size has been described in the present embodiment, the arrangement is not limited to this. For example, the image sensor unit may be formed by connecting three rod-lens arrays of A3 size and connecting five sensor substrates of A4 size. Furthermore, sensor substrates of another size and rod-lens arrays of another size may be connected.

Second Embodiment

The case of forming the image sensor unit 40 by arranging the connection positions between the rod-lens arrays 45a to 45e and the connection positions between the sensor substrates 50a to 50c at positions that do not overlap in the main-scan direction has been described in the first embodiment. A case of also arranging a connection position between light sources 62a and 62b at a position not overlapping with the connection positions between the rod-lens arrays 45a to 45e and the connection positions between the sensor substrates 50a to 50c will be described in the present embodiment.

Figure 8A:
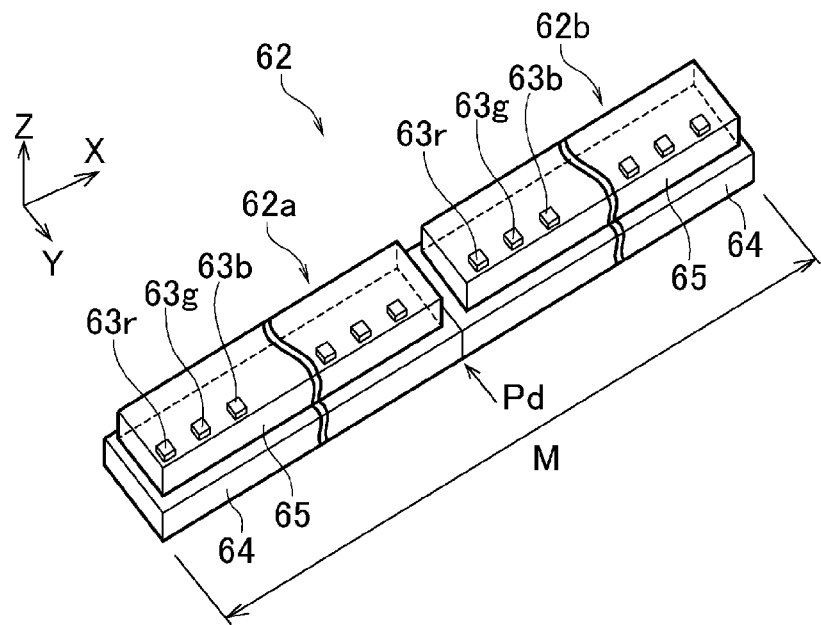
FIG. 8A is a perspective view showing a light source portion 62 of a second embodiment.

FIG. 8A is a perspective view showing a configuration of a light source portion 62 of the present embodiment. As shown in FIG. 8A, the light source portion 62 includes short light sources 62a and 62b connected in a line in the main-scan direction at a connection position Pd that equally divides the read length M into two parts. Each of the light sources 62a and 62b includes, for example: light emitting elements 63r, 63g, and 63b with wavelengths of three colors of red R, green G, and blue B; a substrate 64 for mounting the light emitting elements 63r, 63g, and 63b that is formed long in the main-scan direction; and a diffusion member 65. The diffusion member 65 is attached on the substrate 64 to cover the light emitting elements 63r, 63g, and 63b. The diffusion member 65 diffuses light emitted from the light emitting elements 63r, 63g, and 63b to illuminate the original D.

In the light source portion 62 including the diffusion members 65, the light diffusion may not be uniform and the light amount may be uneven near the connection position (boundary position) Pd of the light source 62a and the light source 62b, because the diffusion member 65 of the light source 62a and the diffusion member 65 of the light source 62b are divided.

Therefore, in the present embodiment, the connection position Pd between the light sources 62a and 62b is arranged at a position not overlapping with the connection positions between the rod-lens arrays 45a to 45e and the connection positions between the sensor substrates 50a to 50c in the main-scan direction. Here, the connection position Pd between the light sources 62a and 62b is a position that equally divides the read length M into two parts. As a result of the arrangement of the connection position between the light sources 62a and 62b, the light amount unevenness between the light sources 62a and 62b and the connection error between the rod-lens arrays 45a to 45e are integrated, and the decrease in the reading quality of the image can be reduced. Similarly, the light amount unevenness between the light sources 62a and 62b and the connection error between the sensor substrates 50a to 50c are integrated, and the decrease in the reading quality of the image can be reduced.

Although the case that the connection position Pd between the light sources 62a and 62b is a position that equally divides the read length M into two parts has been described in the present embodiment, the arrangement is not limited to this. The connection position Pd between the light sources 62a and 62b can be a position not overlapping with the connection positions between the rod-lens arrays 45a to 45e and the connection positions between the sensor substrates 50a to 50c in the main-scan direction, and the connection position of the light sources 62a and 62b is not limited. Furthermore, there can be two or more connection positions.

Figure 8B:
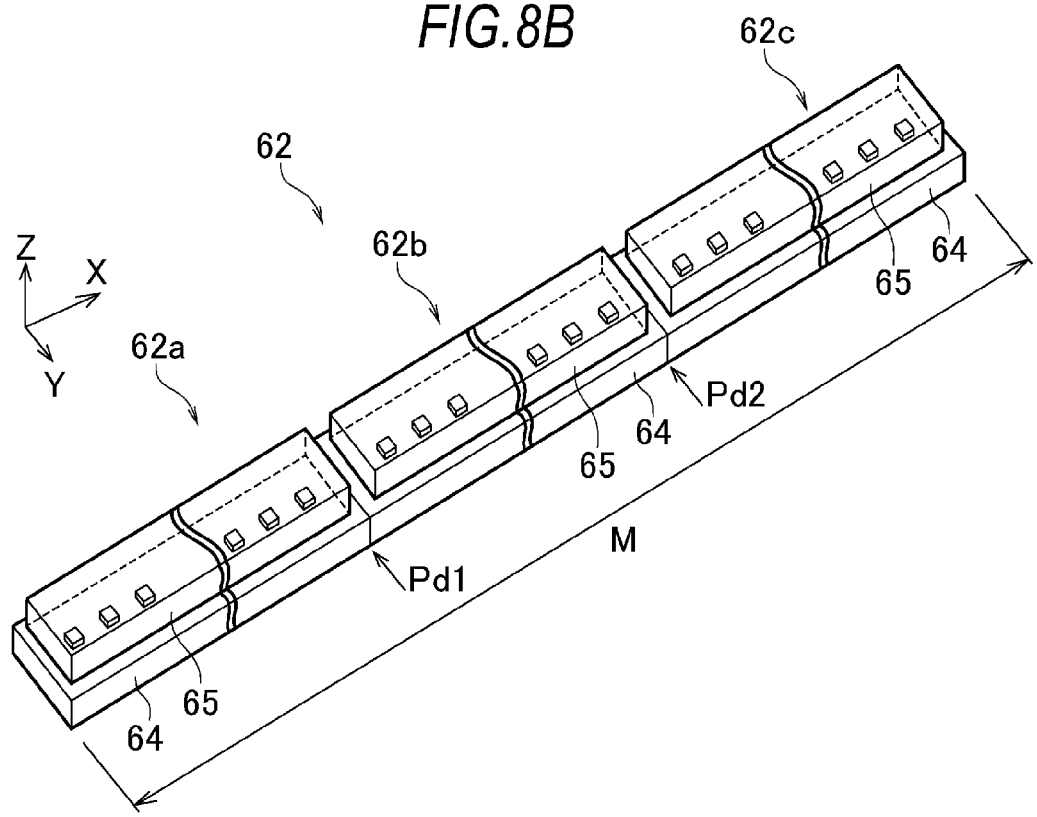
FIG. 8B is a perspective view showing a modified example of the light source portion 62 of the second embodiment.

FIG. 8B is a view showing a modified example with three light sources and two connection positions. In FIG. 8B, the ratio of the length of the substrate 64 of the light source 62a, the substrate 64 of the light source 62b, and the substrate 64 of the light source 62c in the longitudinal direction is 1:2:1, for example. Therefore, the connection position Pd1 and the connection position Pd2 of the light sources 62a to 62c are arranged at positions not overlapping with the connection positions between the rod-lens arrays 45a to 45e and the connection positions between the sensor substrates 50a to 50c in the main-scan direction.

Third Embodiment

In the present embodiment, a case of arranging a connection position between a plurality of light guides 75a and 75b forming a light source portion 72, at a position not overlapping with the connection positions between the rod-lens array 45a to 45e and the connection positions between the sensor substrates 50a to 50c in the main-scan direction, will be described.

Figure 9A:
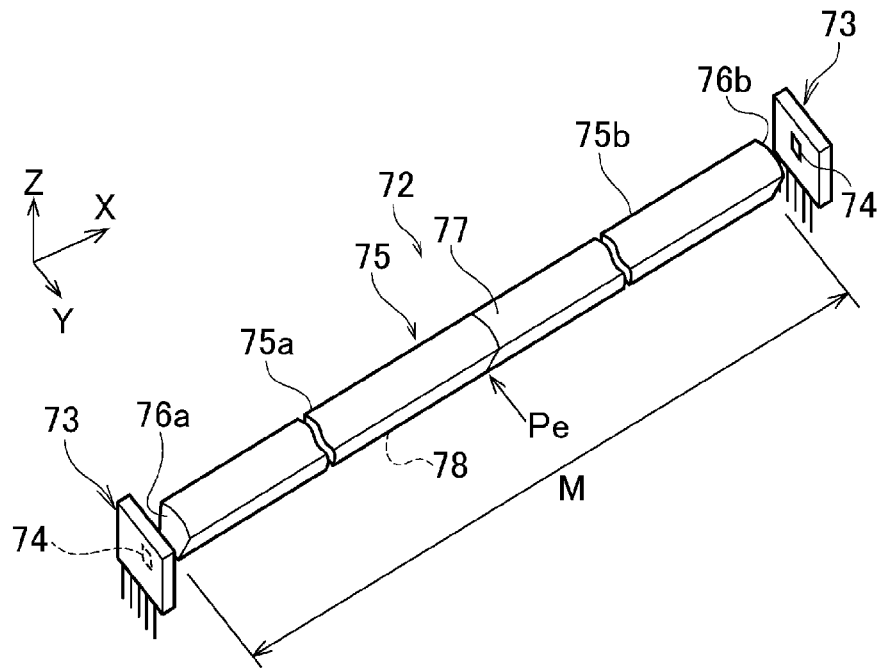
FIG. 9A is a perspective view showing a light source portion 72 of a third embodiment.

FIG. 9A is a perspective view showing a configuration of the light source portion 72 of the present embodiment. As shown in FIG. 9A, the light source portion 72 includes a light emitting portion 73 and a light guide portion 75. The light emitting portion 73 is, for example, an LED module including an LED chip 74 as a light emitting element. In the present embodiment, the light emitting portions 73 are arranged on both end faces of the light guide portion 75. The light guide portion 75 is formed by connecting short light guides 75a and 75b in a line in the main-scan direction at a connection position Pe that equally divides the read length M into two parts. One of the both end faces of the light guide portion 75 in the main-scan direction is an incident surface 76a for receiving light from the light emitting portion 73 on one end, and the other end face is an incident surface 76b for receiving light from the light emitting portion 73 on the other end. On a surface opposing the original D, the light guide portion 75 is also provided with an emission surface 77 for emitting the light incident on the light guide portion 75 to the original D. On a surface opposing the emission surface 77, the light guide portion 75 is also provided with a diffusing surface 78 for reflecting and diffusing the light entered from the incident surface 76a and the incident surface 76b. Therefore, the light source 72 causes the light emitted from the light emitting portions 73 to enter the light guide portion 75 from the incident surfaces 76a and 76b. While the diffusing surface 78 reflects and diffuses the light, the light propagates through the light guide portion 75, and the light is emitted from the emission surface 77. In this way, the light is irradiated on the original D.

In the light source 72 including the connected light guide portion 75, the light guide 75a and the light guide 75b are divided near the connection position Pe between the light guides 75a and 75b. Therefore, the light emitted from the emission surface 77 may not be uniform, and the light amount may be uneven.

In the present embodiment, the connection position Pe between the light guides 75a and 75b of the light source portion 72 is arranged at a position not overlapping with the connection positions between the rod-lens arrays 45a to 45e and the connection positions between the sensor substrates 50a to 50c in the main-scan direction. The connection position Pe between the light guides 75a and 75b is a position that equally divides the read length M into two parts. As a result of the arrangement of the connection position between the light guides 75a and 75b, the light amount unevenness between the light guides 75a and 75b and the connection error between the rod-lens arrays 45a to 45e are integrated, and the decrease in the reading quality of the image can be reduced. Similarly, the light amount unevenness between the light guides 75a and 75b and the connection error between the sensor substrates 50a to 50c are integrated, and the decrease in the reading quality of the image can be reduced.

Although the case that the connection position Pe between the light guides 75a and 75b is a position that equally divides the read length M into two parts has been described in the present embodiment, the arrangement is not limited to this. The connection position Pe between the light guides 75a and 75b can be a position not overlapping with the connection positions between the rod-lens array 45a to 45e and the connection positions between the sensor substrates 50a to 50c in the main-scan direction, and the connection position of the light sources 62a and 62b is not limited. Furthermore, there can be two or more connection positions.

Figure 9B:
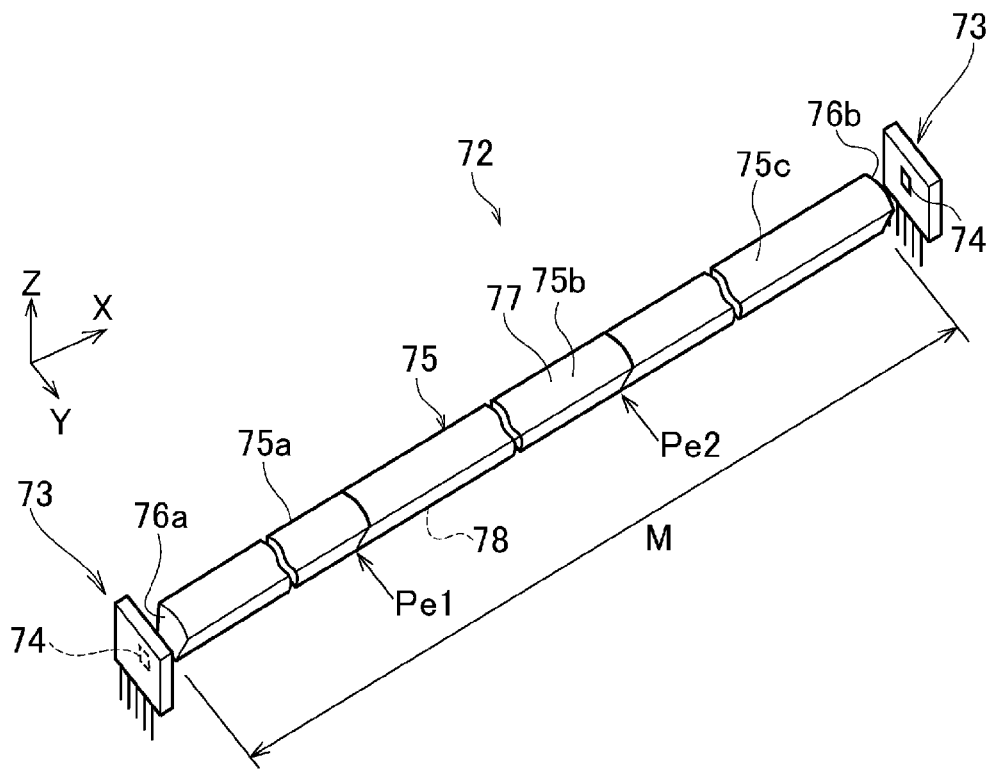
FIG. 9B is a perspective view showing a modified example of the light source portion 72 of the third embodiment.

FIG. 9B is a view showing a modified example with three light guides and two connection positions. In FIG. 9B, the ratio of the length of the light guide 75a, the light guide 75b, and the light guide 75c in the longitudinal direction is 1:2:1, for example. Therefore, a connection position Pe1 and a connection position Pe2 of the light guides 75a to 75c are arranged at positions not overlapping with the connection positions between the rod-lens arrays 45a to 45e and the connection positions between the sensor substrates 50a to 50c in the main-scan direction.

A light emitting portion may be arranged on only one end, instead of arranging the light emitting portions 73 on both ends of the light guide portion 75.

Although the embodiments are used to describe the present invention, the present invention is not limited only to the embodiments, and changes can be made within the scope of the present invention. For example, although the case of using the rod-lens array as the imaging element array has been described in the present embodiment, the arrangement is not limited to this, and a well-known lens array, such as a micro-lens array, can be used.

The present invention can be effectively used for an image sensor unit and for an image reading apparatus and an image forming apparatus (for example, image scanner, facsimile, copying machine, and compound machine) to which the image sensor unit is applied.

According to the present invention, a decrease in the reading accuracy of an image can be reduced even if a plurality image element arrays are connected and a plurality of sensor substrates are connected to form an image sensor unit.

What is claimed is:

1. An image sensor unit comprising:
a sensor substrate including a plurality of sensor chips arranged in a main-scan direction, each of the plurality of sensor chips configured to convert light from an object to be read to electric signals; and
an imaging element array including a plurality of imaging elements arranged in the main-scan direction, each of the plurality of imaging elements configured to focus the light from the object to be read on a sensor chip, wherein
a plurality of the sensor substrates are connected together in the main-scan direction,
a plurality of the imaging element arrays are connected together in the main-scan direction such that an imaginary line extending parallel to the main-scan direction intersects at least two imaging element arrays of the plurality of the imaging element arrays, and
connection positions between the plurality of sensor substrates are arranged at positions not overlapping with connection positions between the plurality of imaging element arrays in the main-scan direction.

2. The image sensor unit according to claim 1, wherein
each imaging element array of the plurality of imaging element arrays is provided with the plurality of imaging elements arranged in the main-scan direction, with optical axes of the plurality of imaging element being parallel, and
the connection positions between the plurality of sensor substrates are arranged separately from a range where field diameters of two of the imaging elements adjacent to each other at the connection positions between the plurality of imaging element arrays overlap.

3. The image sensor unit according to claim 2, wherein
the range is
$2X_0-D$,
where $X_0$ denotes a field radius of the imaging element, and D denotes a diameter of the imaging element.

4. The image sensor unit according to claim 1, wherein
the number of the connection positions between the plurality of sensor substrates is two or more, and
the number of the connection positions between the plurality of imaging element arrays is two or more.

5. The image sensor unit according to claim 1, further comprising
a plurality of light sources that are connected in the main-scan direction and that emit light to the object to be read, wherein
connection positions between the plurality of light sources are arranged at positions not overlapping with the connection positions between the plurality of sensor substrates and the connection positions between the plurality of imaging element arrays in the main-scan direction.

6. The image sensor unit according to claim 5, wherein
each light source of the plurality of light sources comprises: light emitting elements; a substrate for mounting the light emitting elements that is long in the main-scan direction; and a diffusion member attached to the substrate to cover the light emitting elements.

7. The image sensor unit according to claim 5, wherein
the number of connection positions of the plurality of light sources is two or more.

8. The image sensor unit according to claim 1, further comprising
a plurality of light guides that are connected in the main-scan direction and that internally propagate light entered from a light emitting portion to emit the light to the object to be read, wherein
connection positions between the plurality of light guides are arranged at positions not overlapping with the connection positions between the plurality of sensor substrates and the connection positions between the plurality of imaging element arrays in the main-scan direction.

9. The image sensor unit according to claim 8, wherein
the number of the connection positions of the plurality of light guides is two or more.

10. The image sensor unit according to claim 1, wherein
the plurality of sensor substrates are connected end-to-end to each other in the main-scan direction.

11. The image sensor unit according to claim 10, wherein
the plurality of imaging element arrays are connected end-to-end to each other in the main-scan direction.

12. The image sensor unit according to claim 1, wherein the plurality of imaging element arrays are disposed directly between the object to be read and the plurality of sensor substrates when focusing light from the object to be read.

13. An image sensor unit comprising:
a sensor substrate including a plurality of sensor chips arranged in a main-scan direction, each of the plurality of sensor chips configured to convert light from an object to be read to electric signals; and
an imaging element array including a plurality of imaging elements arranged in the main-scan direction, each of the plurality of imaging elements configured to focus the light from the object to be read on a sensor chip, wherein
a plurality of the sensor substrates are connected together in the main-scan direction,
a plurality of the imaging element arrays are connected together in the main-scan direction,
connection positions between the plurality of sensor substrates are arranged at positions not overlapping with connection positions between the plurality of imaging element arrays in the main-scan direction,
each imaging element array of the plurality of imaging element arrays is provided with the plurality of imaging elements arranged in the main-scan direction, with optical axes of the plurality of imaging element being parallel,
the connection positions between the plurality of sensor substrates are arranged separately from a range where field diameters of two of the imaging elements adjacent to each other at the connection positions between the plurality of imaging element arrays overlap, and
the range is $2X_0$-D,
where $X_0$ denotes a field radius of the imaging element, and D denotes a diameter of the imaging element.

14. The image sensor unit according to claim 13, wherein
the number of the connection positions between the plurality of sensor substrates is two or more, and
the number of the connection positions between the plurality of imaging element arrays is two or more.

15. The image sensor unit according to claim 13, further comprising
a plurality of light sources that are connected in the main-scan direction and that emit light to the object to be read, wherein
connection positions between the plurality of light sources are arranged at positions not overlapping with the connection positions between the plurality of sensor substrates and the connection positions between the plurality of imaging element arrays in the main-scan direction.

16. The image sensor unit according to claim 15, wherein
each light source of the plurality of light sources comprises: light emitting elements; a substrate for mounting the light emitting elements that is long in the main-scan direction; and a diffusion member attached to the substrate to cover the light emitting elements.

17. The image sensor unit according to claim 15, wherein
the number of connection positions of the plurality of light sources is two or more.

18. The image sensor unit according to claim 13, further comprising
a plurality of light guides that are connected in the main-scan direction and that internally propagate light entered from a light emitting portion to emit the light to the object to be read, wherein
connection positions between the plurality of light guides are arranged at positions not overlapping with the connection positions between the plurality of sensor substrates and the connection positions between the plurality of imaging element arrays in the main-scan direction.

19. The image sensor unit according to claim 18, wherein
the number of the connection positions of the plurality of light guides is two or more.

20. The image sensor unit according to claim 13, wherein
the plurality of sensor substrates are connected end-to-end to each other in the main-scan direction.

21. The image sensor unit according to claim 20, wherein
the plurality of imaging element arrays are connected end-to-end to each other in the main-scan direction.

22. The image sensor unit according to claim 13, wherein the plurality of imaging element arrays are disposed directly between the object to be read and the plurality of sensor substrates when focusing light from the object to be read.

23. An image forming apparatus comprising:
an image sensor unit;
an image reading portion that reads light from an object to be read while relatively moving the image sensor unit and the object to be read; and
an image forming portion that forms an image in a recording medium, the image sensor unit comprising:
a sensor substrate including a plurality of sensor chips arranged in a main-scan direction, each of the plurality of sensor chips configured to convert light from an object to be read to electric signals; and
an imaging element array including a plurality of imaging elements arranged in the main-scan direction, each of the plurality of imaging elements configured to focus the light from the object to be read on a sensor chip, wherein a plurality of the sensor substrates are connected together in the main-scan direction, a plurality of the imaging element arrays are connected together in the main-scan direction, connection positions between the plurality of sensor substrates are arranged at positions not overlapping with connection positions between the plurality of imaging element arrays in the main-scan direction, each imaging element array of the plurality of imaging element arrays is provided with the plurality of imaging elements arranged in the main-scan direction, with optical axes of the plurality of imaging element being parallel, the connection positions between the plurality of sensor substrates are arranged separately from a range where field diameters of two of the imaging elements adjacent to each other at the connection positions between the plurality of imaging element arrays overlap, and the range is $2X_0 - D$, where $X_0$ denotes a field radius of the imaging element, and D denotes a diameter of the imaging element.

\* \* \* \* \*